(12) United States Patent
Gonzalez

(10) Patent No.: US 7,014,238 B2
(45) Date of Patent: Mar. 21, 2006

(54) AUTOMATICALLY AND REVERSIBLY TRANSFORMABLE TRAILER-TO-RAISED LOOKOUT PLATFORM

(76) Inventor: Jaime Humberto Gutierrez Gonzalez, Santa Elena No. 1341, Col. La Purisima, Guadalupe, Nuevo Leon (MX) CP 67120

( * ) Notice: Subject to any disclaimer, the term of this patent is extended or adjusted under 35 U.S.C. 154(b) by 0 days.

(21) Appl. No.: 10/833,777

(22) Filed: Apr. 28, 2004

(65) Prior Publication Data

US 2005/0194807 A1    Sep. 8, 2005

(30) Foreign Application Priority Data

Mar. 2, 2004    (MX) .................. PA/A/2004/001992

(51) Int. Cl.
*B60P 3/34* (2006.01)
(52) U.S. Cl. .............................. 296/26.05; 296/26.01; 296/26.04; 135/88.01
(58) Field of Classification Search ............. 296/26.01, 296/26.04, 26.05, 165, 168, 171–176; 135/88.01, 135/141, 901, 912; 182/127, 141; 43/1
See application file for complete search history.

(56) References Cited

U.S. PATENT DOCUMENTS

| | | | |
|---|---|---|---|
| 4,606,142 A | 8/1986 | Reneau | |
| 5,102,179 A | 4/1992 | Royer | |
| 5,505,515 A | 4/1996 | Turner | |
| 5,564,523 A | 10/1996 | Howard | |
| 5,862,827 A * | 1/1999 | Howze | ........................ 135/140 |
| 5,979,972 A | 11/1999 | Gehman | |
| 6,283,536 B1 * | 9/2001 | Muzyka et al. | ............. 296/165 |
| 6,311,434 B1 * | 11/2001 | Nelson | ......................... 52/143 |
| 6,460,653 B1 * | 10/2002 | Hardy et al. | ................ 182/63.1 |
| 6,523,641 B1 | 2/2003 | Smith | |
| 6,527,336 B1 * | 3/2003 | Hernandez et al. | ....... 296/182.1 |
| 6,604,777 B1 * | 8/2003 | Neville | ........................ 296/164 |
| 6,679,542 B1 * | 1/2004 | Semotuk | ...................... 296/174 |
| 6,722,726 B1 * | 4/2004 | Parmer | ....................... 296/157 |
| 6,749,252 B1 * | 6/2004 | Cervenka | ..................... 296/165 |

* cited by examiner

*Primary Examiner*—D. Gleen Daycan
*Assistant Examiner*—Greg Blakenship
(74) *Attorney, Agent, or Firm*—John A. Thomas

(57) ABSTRACT

The present invention is related to a unit utilized in the practice of outdoor sports, specifically, but not solely, for stalking and legally hunting animals. Specifically it refers to an automatically and reversibly transformable trailer-to-raised lookout platform from which the animals may be observed for the purpose of filming them, photographing them or hunting them. It is characterized by consisting of a cube-shaped structure with at least one set of wheels and a hitch for connecting it to a towing vehicle, with a roof made up of a platform and an awning which may be raised and lowered by means of telescoping arms located in each corner and activated by an elevation system which raises the platform above the trailer thus forming the floor of an observation and lookout cabin, as well as the awning which at the same time is raised above the platform making between the awning and the platform means for covering the side opening of the cabin. The trailer also has an interior telescoping ladder which connects the inside of the trailer with the inside of the elevated cabin through an access opening in the platform floor of the elevated cabin. The trailer also has at least one side access door.

12 Claims, 7 Drawing Sheets

AUTOMATICALLY AND REVERSIBLY TRANSFORMABLE TRAILER-TO-RAISED LOOKOUT PLATFORM

FIELD OF THE INVENTION

The present invention is related to equipment and accessories used for transportation and for practicing open air sports, specifically, but not exclusively, for stalking or legally hunting game animals. It specifically refers to a trailer which can be towed by any vehicle and which automatically is converted into an elevated lookout platform from which to stalk animals, film and photograph them or hunt them.

BACKGROUND

Throughout history in the area of hunting animals, structures, equipment and accessories have been developed to be used in the observation, stalking or legal hunting of game animals, from the most rustic to the most modern with technological developments making them more and more functional and safe.

Most of the platforms are elevated structures from which one has a better perspective and visualization of the animals. There are lookout platforms which must be joined together piece by piece and set up manually using many coupling mechanisms and tools as well as several people to set them up. This makes the assembly and use difficult, requiring too much time for installation, and often high costs and often the platform which is assembled is a permanent structure which cannot be moved, thus limiting its use.

Prior-art cabins to stalk or hunt different animals are complex structures. Typically, the structure is permanent, not moveable or, can be taken apart and reassembled in another place, entailing the corresponding work of setting up and taking down the structure. Or, an open trailer base is needed to carry the structure with the piston and the cabin, making necessary multiple accessories and elements to hold the structure in an elevated position.

A closed trailer which can automatically and reversibly be transformed into a lookout platform to be used to monitor, observe or hunt diverse animals, and other possible uses and which can be pulled by any type of vehicle without the need of labor, tools, accessories, etc. would be extremely practical, functional and advantageous.

SUMMARY

Generally, the automatically transformable and reversible trailer-to-raised lookout platform, according to the present invention, consists of a substantially cubic structure with at least one pair of wheels and a hitch to connect the trailer to a hauling vehicle; with a roof made up of a platform and an awning that can be raised by means of telescoping arms placed at each corner and activated by an elevation system which raises the platform above the trailer thus forming the floor of the observation and monitoring cabin, just as the awning is raised above the platform leaving side coverings for the cabin as it is raised. The trailer is made up of a fixed interior telescoping ladder which is raised simultaneously with the platform, the stairway being attached at the top to the platform and which connects the inside of the trailer with the inside of the elevated cabin through an access opening in the later made in the platform.

The trailer, in one of its versions, is made up of at least one hinged wall which upon folding it down forms a ramp into the inside of the trailer and having at least one side entrance door.

In another preferred version of the invention, between the platform formed by the floor of the elevated cabin and the awning, when raised, there is a frame from which removable side coverings are hung, leaving a free upper space in the form of large windows.

On the upper surface of the platform there are means for attaching at least one dismountable revolving seat.

The side coverings of the elevated cabin are made up of removable camouflaged curtains with inside means of raising and lowering, partially or completely, the curtains.

The entrance opening in the platform of the elevated cabin is made up of a hinged or sliding door.

The telescoping supporting arms placed at each corner, consist of transverse bored holes for the insertion of safety bolts to be inserted when the cabin is in the elevated position and which interact with the upper edge of the walls of the trailer.

On the inside of the trailer there is a compartment where an electric motor through a system of pulleys winds and unwinds a cable on a spool which raises and lowers the platform as well as the awning using the telescoping arms.

The trailer consists of at least one lateral means of rear coupling for the attachment of adjustable legs, which are used to give the trailer stability. The wheels may be removed when the trailer hitch is used as a third support point.

All the lateral walls of the trailer as well as the awning of the roof are camouflaged, and in the preferred presentation the automatically and reversibly transformable trailer-to-raised lookout platform is designed to be pulled by pick-up trucks, automobiles, four wheeled motorcycle and other similar vehicles; preferably to be pulled by a four wheeled motorcycle which, once the observation deck and lookout cabin used to monitor animals for the purpose of filming them, photographing them or hunting them, have been set up, the four wheeled motorcycle can be put away inside the cabin via the access ramp made by at least one wall which can be folded down.

Illustrative drawings which are not limiting are presented now to better understand the characteristics of the present description.

Figure 1:
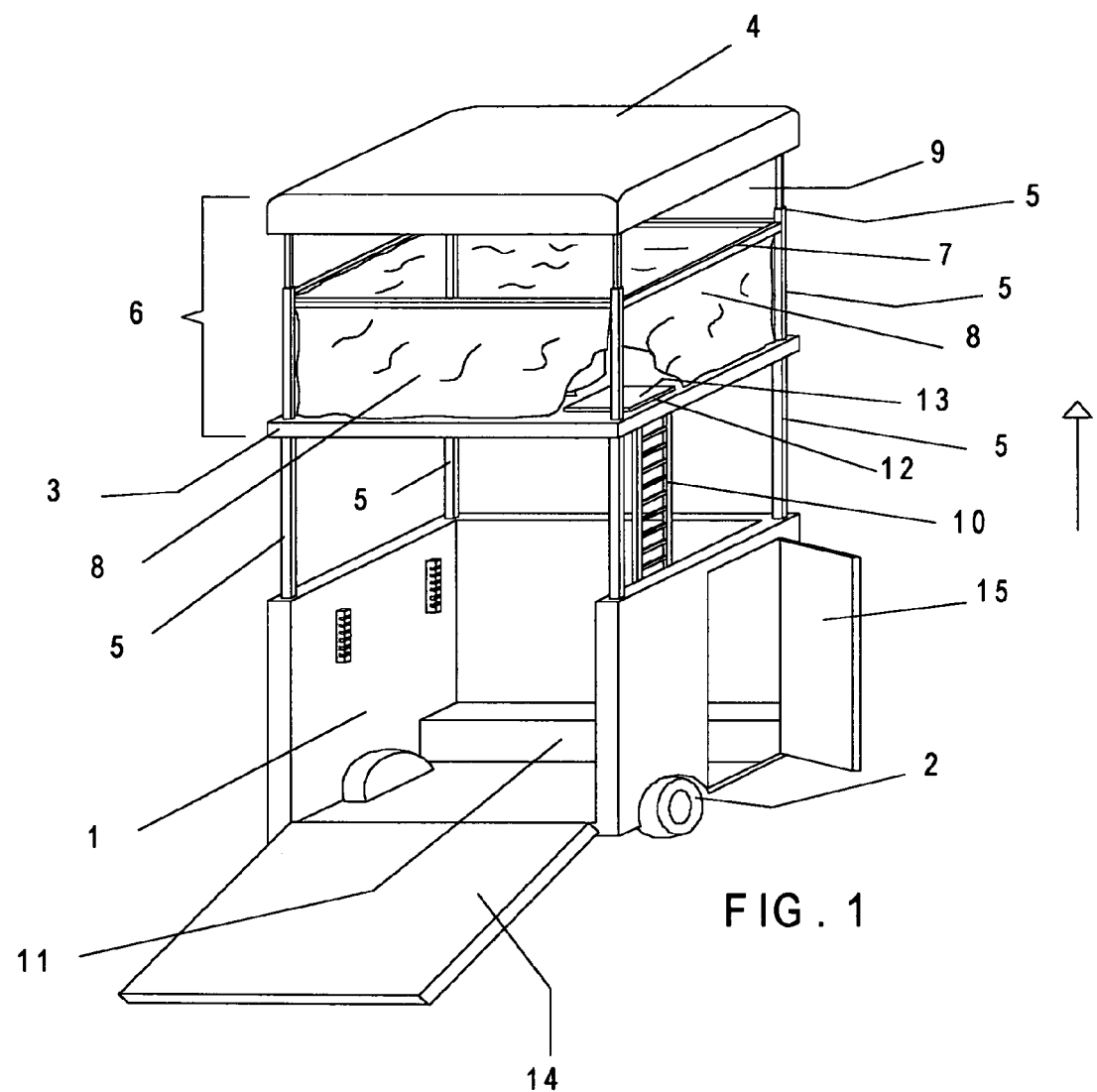
FIG. 1 shows a conventional view of the trailer converted into an observation platform.

In order to have a better understanding of the invention a detailed description of some of the variations of the present invention will be presented as shown in the annexed drawings which are illustrative but not limiting.

DETAILED DESCRIPTION

The characteristic details of the automatically and reversibly transformable trailer-to-raised lookout platform are clearly shown in the following descriptions and the illustrative drawings which are annexed, using the same reference numbers to refer to the same parts in the text as in the drawings.

FIG. 1 shows a view of the trailer turned into a lookout platform. In the figure, the trailer turned into a lookout platform consists of a substantial cube shaped figure (1) with a set of side wheels (2) and a front hitch (not shown) to attach it to the towing vehicle; with a roof that when set up is made up of a platform (3) and an awning (4), raised by means of telescoping elevating arms, which lift platform (3) above the substantial cube shaped figure (1), thus forming an elevated cabin floor (6) and an awning (4) which are in turn raised above the platform (3), making up between the awning (4) and the platform (3) a frame (7) from which the removable coverings (8) of cabin (6) are hung thus forming a free upper area in the form of windows (9) and which may be raised partially or completely by means of pulling from the inside.

The trailer is made up of a fixed telescoping ladder (10) on the inside wall, which is raised simultaneously with platform (3) since it is attached to the upper edge of the platform, and which connects the inside of trailer (11) with the inside of raised cabin (6) through an access opening (12) in platform (3) through a hinged door (13) into the elevated cabin.

Rear wall (14) of the trailer is hinged and may be lowered to form a ramp into the interior of the trailer. There is also a side access door (15).

The inside of platform (3) contains a safety compartment (37) with top access 11 where arms may be stored and kept out of reach of children. Once the platform is raised to form a floor, the access to this compartment is through the floor.

Figure 2:
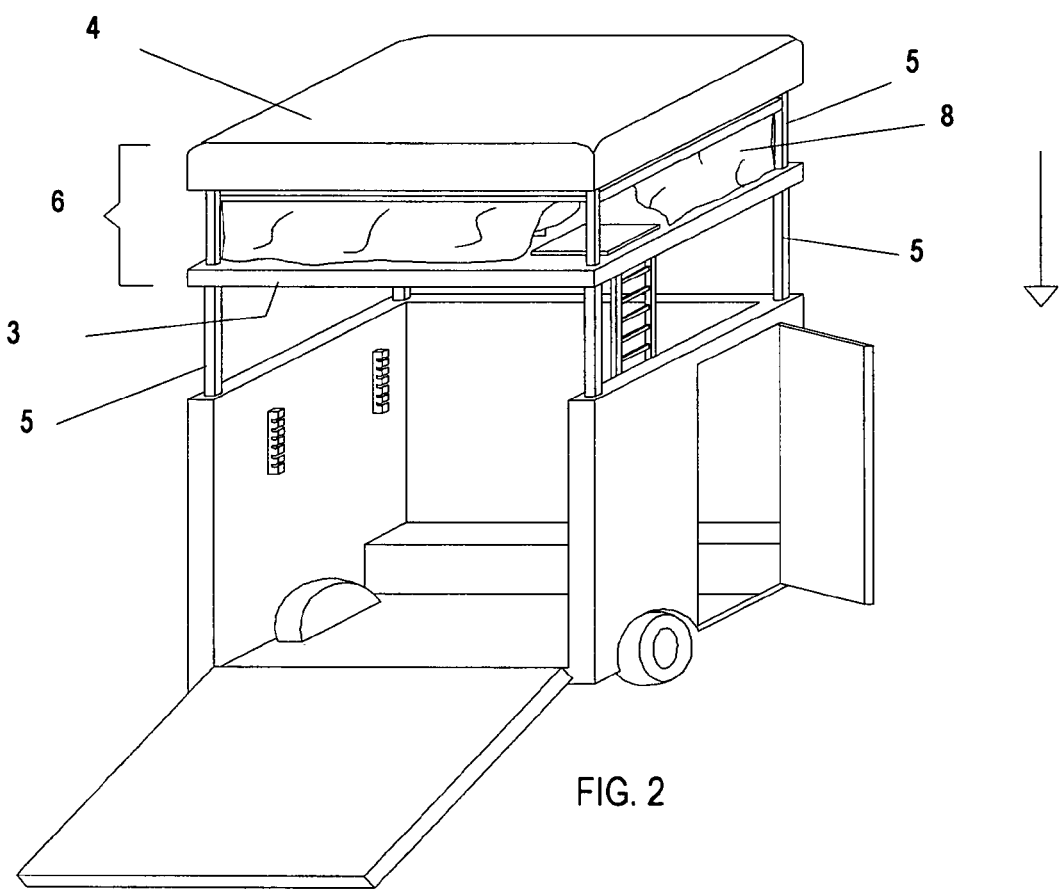
FIG. 2 shows a conventional view of the trailer in the process of the platform and awning being collapsed.

FIG. 2 shows a view of the trailer in the process of collapsing the platform and the awing. In the figure, platform (3) and awning (4) collapse by means of the action of the telescoping arms (5) in each corner; attachable side window coverings (8) are held in place within the inside of cabin (6) in the collapsing process.

Figure 3:
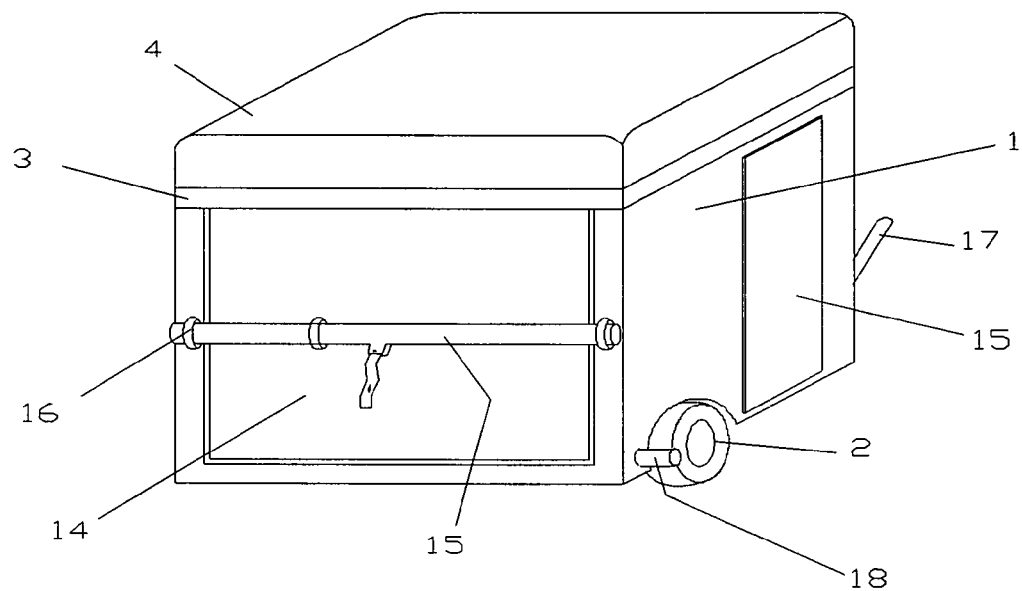
FIG. 3 shows a conventional view of the structure of the trailer before it is transformed.

FIG. 3 shows a view of the trailer structure without any transformation. In the figure, platform (3) and awning (4) are placed one on top of the other forming the roof of the trailer and covering the cube shaped body (1) of the trailer. The rear collapsible wall (14) is raised and held against the side walls by a closing element (15) which at each end is placed in holding means (16) permanently attached to the side walls of the trailer.

Rear access door (15) allows for access into the inside of the trailer, its being in the front wall near the front hitch (17) with which the trailer is attached to the towing vehicle.

The trailer has at least one lateral means (18) for the outside attaching of the adjustable arms (not shown), which would stabilize the trailer, making it possible to remove the two lateral wheels (2) and using hitch (17) as a third support point.

Also the trailer has upper fixed rings or other means of attachment (40) where rope, cables, belts or other similar elements (38) may be attached. These ropes, etc. are attached to stakes (39) which are hammered into the ground to provide stability to the trailer especially when the trailer is in its raised variation, thus preventing it from moving or being blown over by the wind or other phenomena.

Figure 4:
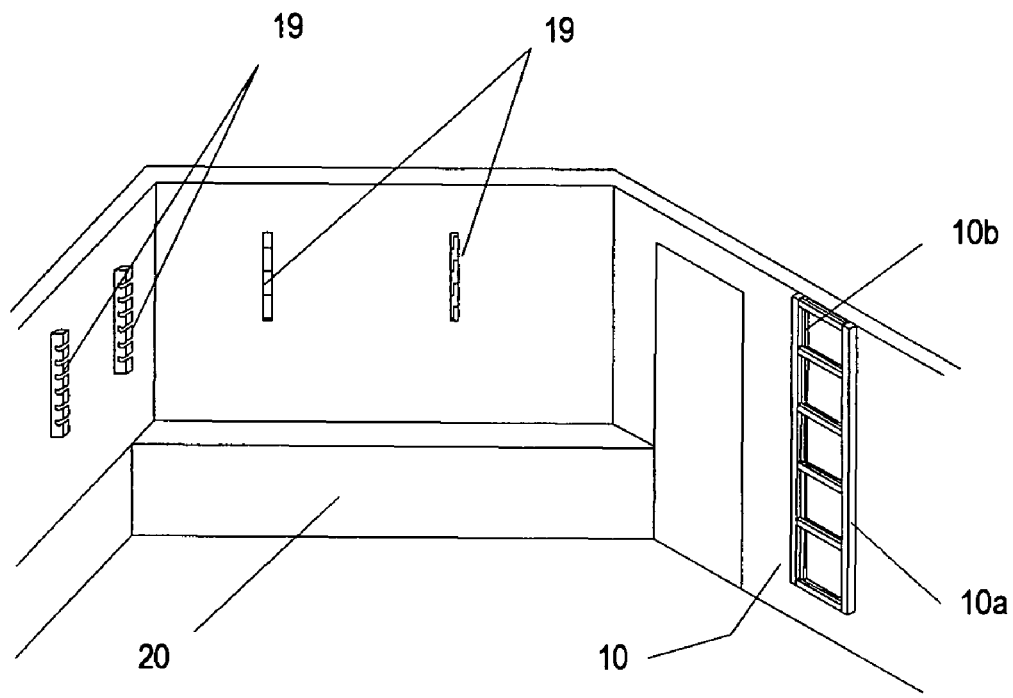
FIG. 4 shows a conventional view of a portion of the inside of the trailer.

FIG. 4 shows a view of an inside portion of the trailer. In the view we observe the telescoping ladder (10) which is made up of a fixed section (10a) on the inside wall of the trailer and an upper telescoping section (10b) located above the first section (10a) and attached to the bottom of platform (3). It also consists of mounting accessories and affixing means (19) for hanging of fixing tools, arms and other articles, as well as compartment (20) where the elements of the elevation system are stowed.

Figure 5:
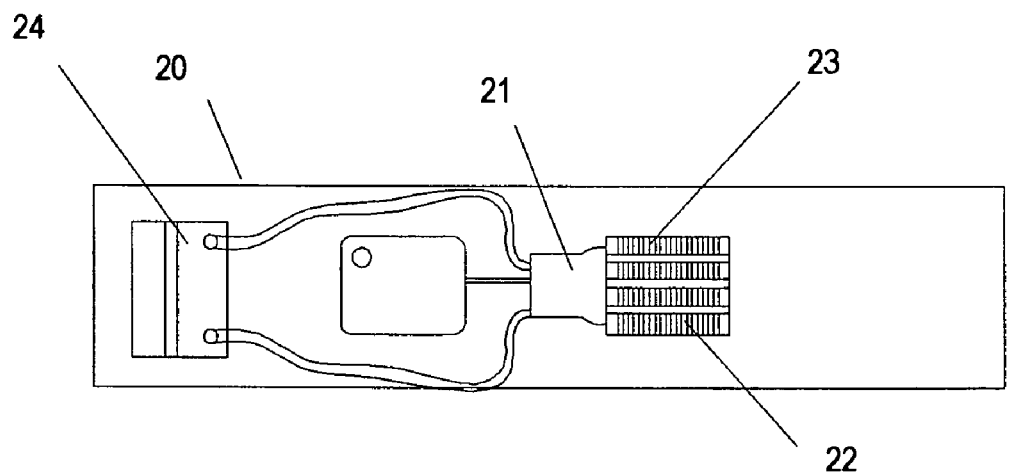
FIG. 5 shows a top view of the compartment where the motor is stowed.

FIG. 5 shows a top view of the compartment where the motor is stored. In the drawing, in compartment (20) the electric motor (21) which winds or unwinds cable (22) on spool (23) is stored. The motor is run on a battery (24) which is also stored in this compartment. The adjustable support arms (not shown) may also be stored in this compartment.

Figure 5A:
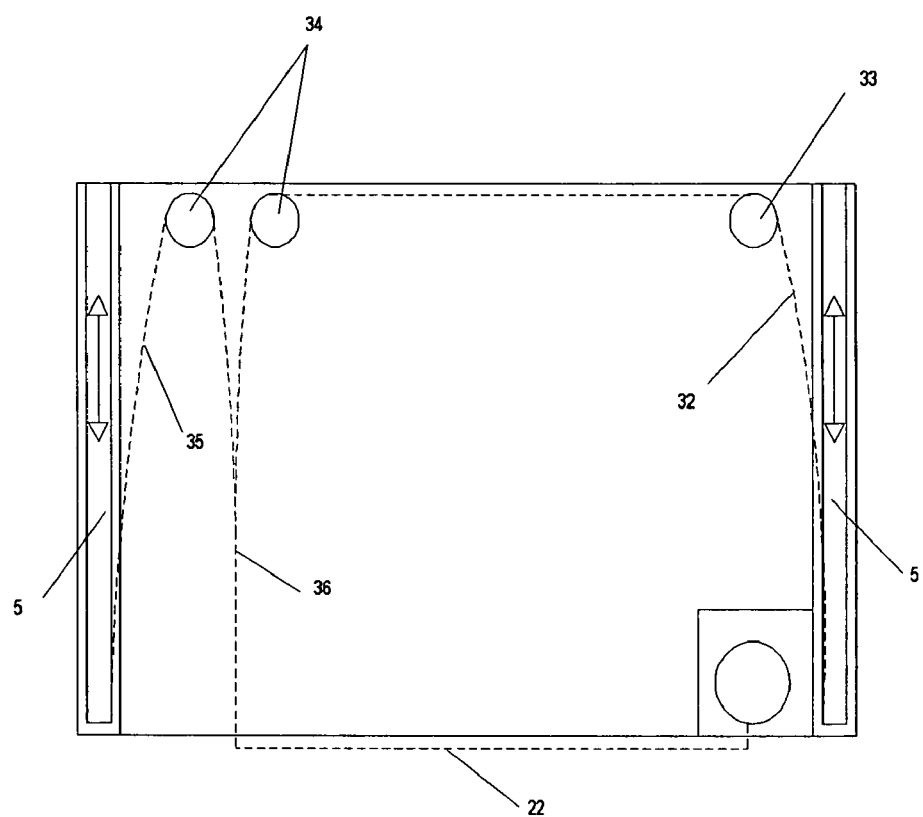
FIG. 5a shows a schematic diagram of the elevation system of the cabin.

FIG. 5a shows a schematic diagram of the elevation system of the cabin. In the figure, at the two ends of each side wall of the trailer there is a telescoping arm (5). Each telescoping arm is made up of a section of cable attached to the end of the arm. Also there is a pulley (33) at the front end of each side wall and two pulleys (34) at the back edge. The two front cables (32) work with front pulley (33) and one rear pulley (34). The rear cables (35) work with one of the rear pulleys (34). The two front cables (32) are attached to the two rear cables (35) in order to form the two cables (36), which in turn are joined under the trailer to form one cable (22) which is wound around spool (23), activated by motor (21) to slowly raise telescoping arms (5) and raise platform (3) and awning (4) to form the elevated platform and in a reverse process to form the roof of the trailer.

Figure 6:
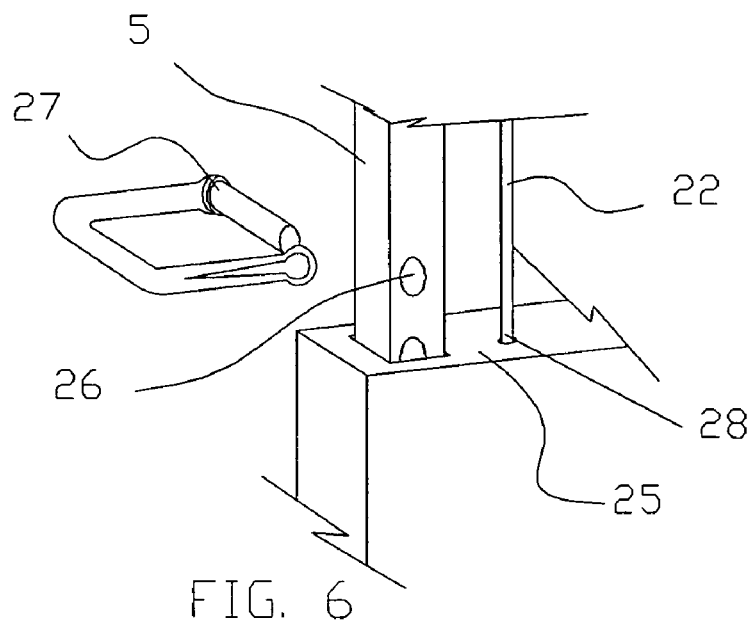
FIG. 6 shows a partial section of the telescoping arms of the raising platform.

FIG. 6 shows a partial section of a telescoping arm of the raised platform. In the figure telescoping arms (5) in each corner, are stored in cavities (25) in the wall of the trailer. The telescoping arms have transverse holes (26) in which may be inserted safety bolts (27) when the cabin is placed in the elevated position by cables (22) which run through holes (28) in the walls of the trailer.

Figure 7:
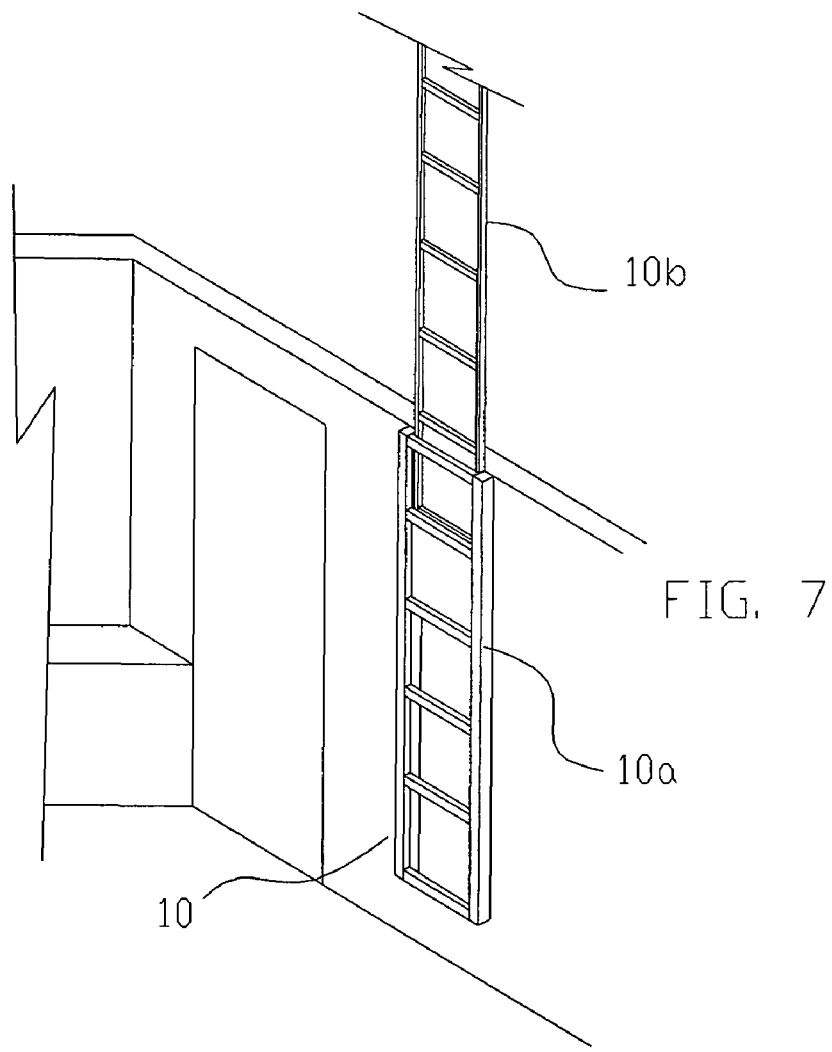
FIG. 7 shows a conventional view of a portion of the inside of the trailer.

FIG. 7 shows a view of an inside portion of the trailer. In the figure telescoping ladder (10) is shown in the extended position, fixed section (10a) being attached to the inside of a side wall of the trailer and extended telescoping section (10b) connecting the inside of the trailer with the inside of the elevated cabin (not shown).

Figure 8:
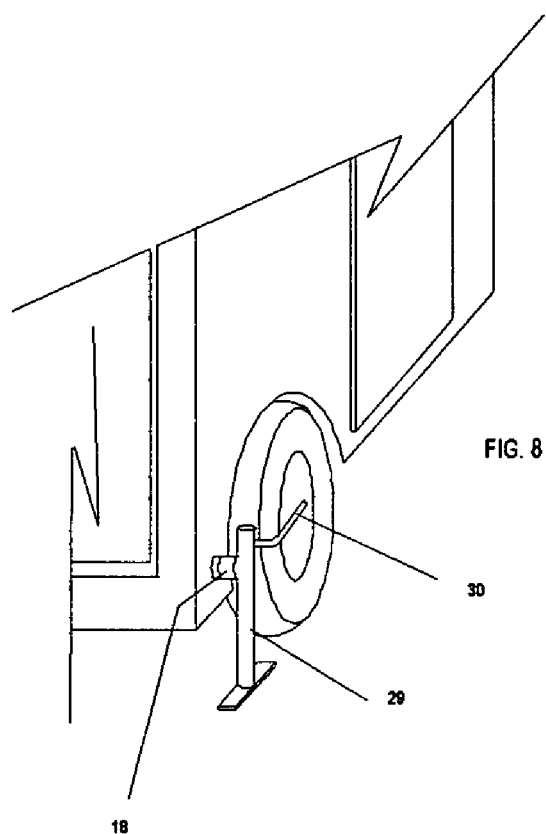
FIG. 8 shows a conventional view of a portion of the back side of the trailer.

FIG. 8 shows a view of a rear, side portion of the trailer. In the figure the adjustable arms (29), whose height is regulated by a spinning lever (30), are attached by fixed rear couplings in the lower rear part of the side walls of the trailer, and which provide stability and support to the trailer, at the same time being used to raise the trailer and remove the wheels (not shown).

Figure 9:
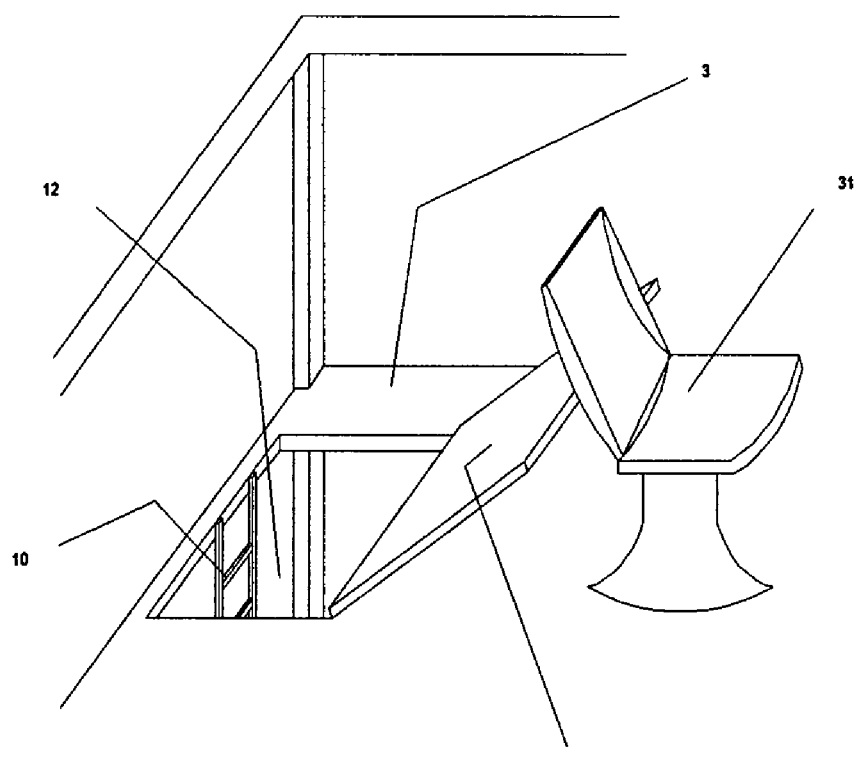
FIG. 9 show a conventional view of a portion of the inside of the elevated cabin.

FIG. 9 shows a view of an interior portion of the elevated cabin. In the figure, platform (3) which makes the elevated floor (6) of the cabin has an access opening (12) covered by a hinged door (13) which connects the inside of the trailer with the inside of the elevated cabin by means of the telescoping ladder (10). Inside the cabin there is also a removable revolving chair (31).

The invention has been sufficiently described so that anyone with knowledge in the state of the art may reproduce and obtain the aforementioned results for the invention. However, anyone knowledgeable in the field of the present invention may be able to make modifications not specifically described in the present application, and if for the application of the modifications of a determined structure or process of manufacturing the same, the material claimed in the following claims is required, the structure is included within the scope of this invention.

I claim:

1. An automatically and reversably transformable trailer-to-lookout: comprising:
   a platform disposed over the trailer; the platform having corners; the platform further comprising:
   an awning;
   a telescoping arm located at each corner of the platform; each telescoping arm having at least a first and second section;
   the first section of each telescoping arm engaging a corner of the platform;
   the second section of each telescoping arm engaging the awning;
   an elevation system; the first and second sections of each telescoping arm connected to the elevation system;
   so that the awning is raised above the platform at the same time the platform is raised above the trailer when the elevation system is actuated.

2. The automatically and reversibly transformable trailer-to-raised lookout platform of claim 1 further comprising at least one fold down wall which forms a ramp for access into the trailer.

3. The automatically and reversibly transformable trailer-to-raised lookout platform of claim 1 further comprising at least one removable revolving chair attached to the platform.

4. The automatically and reversibly transformable trailer-to-raised lookout platform of claim 1 further comprising a door in the platform for access to the elevated platform.

5. The automatically and reversibly transformable trailer-to-raised lookout platform of claim 1, where the telescoping arms placed at each corner have transverse holes for the insertion of security bolts.

6. The automatically and reversibly transformable trailer-to-raised lookout platform of claim 1 further comprising removable side coverings between the floor of the platform and the awning, when the platform is in the elevated position.

7. The automatically and reversibly transformable trailer-to-raised lookout platform of claim 6 further where the removable side coverings are camouflaged curtains, and further comprising means inside the cabin for raising and lowering the curtains and holding the curtains in place inside the cabin.

8. The automatically and reversibly transformable trailer-to-raised lookout platform of claim 1, where the awning is connected to an electric motor by cables and pulleys for vertical movement of the awning.

9. The automatically and reversibly transformable trailer-to-raised lookout platform of claim 1, where the trailer has at least one means for rear mounting of adjustable legs for stability.

10. The automatically and reversibly transformable trailer-to-raised lookout platform of claim 1, characterized by both the walls and awning thereof being camouflaged.

11. The automatically and reversibly transformable trailer-to-raised lookout platform of claim 1, characterized by the platform which makes up the floor of the elevated cabin having a safety compartment beneath it with topside access.

12. The automatically and reversibly transformable trailer-to-raised lookout platform of claim 1, characterized by having upper fixed means for attaching ropes, cables, belts of other similar means which are anchored to the ground on the other end to provide stability.

* * * * *